No. 707,893. Patented Aug. 26, 1902.
A. ANDERSON.
DRAFT EQUALIZER.
(Application filed June 6, 1902.)

(No Model.)

Witnesses  Inventor
Andrew Anderson
by his Attorney

THE NORRIS PETERS CO., PHOTO-LITHO., WASHINGTON, D. C.

UNITED STATES PATENT OFFICE.

ANDREW ANDERSON, OF MEDO, MINNESOTA.

DRAFT-EQUALIZER.

SPECIFICATION forming part of Letters Patent No. 707,893, dated August 26, 1902.

Application filed June 6, 1902. Serial No. 110,545. (No model.)

*To all whom it may concern:*

Be it known that I, ANDREW ANDERSON, a citizen of the United States, residing at Medo, in the county of Blue Earth and State of Minnesota, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in vehicle-shafts, and especially to that style of shaft by which the horse is permitted to travel at one side of the road without material side draft.

The object of my invention is to provide a shaft of the above-mentioned type with an equalizer attached directly to the shafts that will equalize all side draft.

An advantage of the invention is that the equalizer will not only relieve the vehicle from all undue vibration and side draft, but will cause the vehicle to pull straight or "track." Furthermore, a horse "hitched" to my shafts will be enabled to travel in the track of a double team and the draft will be from the center, thereby causing the vehicle to follow or track after other vehicles without material side draft or quivering.

To the accomplishment of the foregoing and such other objects as may hereinafter appear the invention consists in the construction and in the combination of parts hereinafter particularly described and then sought to be clearly defined by the claims, reference being had to the accompanying drawings, forming a part hereof, and in which—

Figure 1:
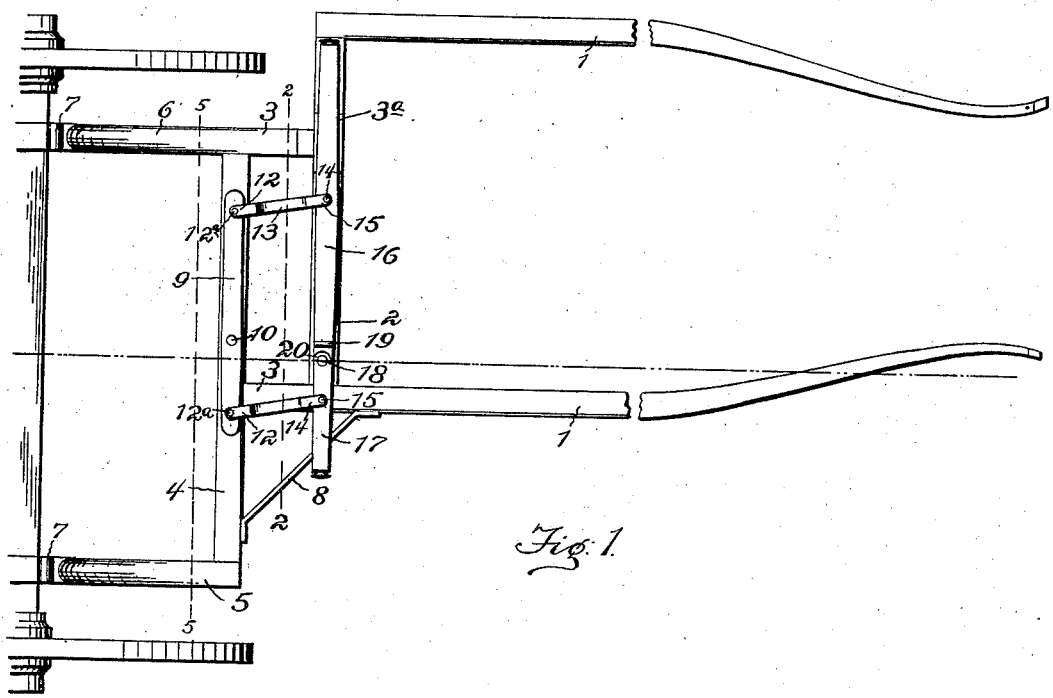
Figure 2:
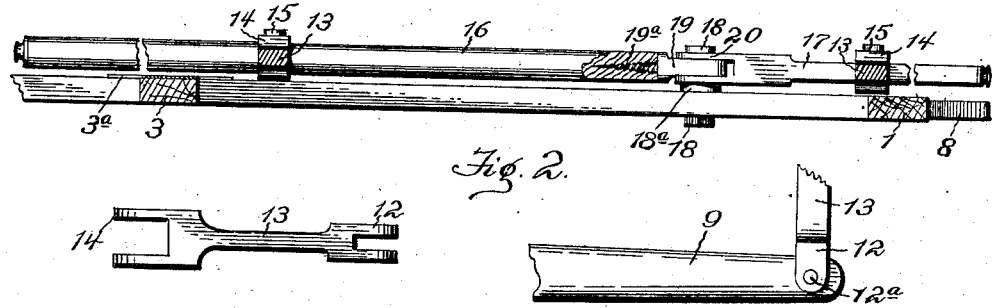
Figures 3, 4:
Figure 5:
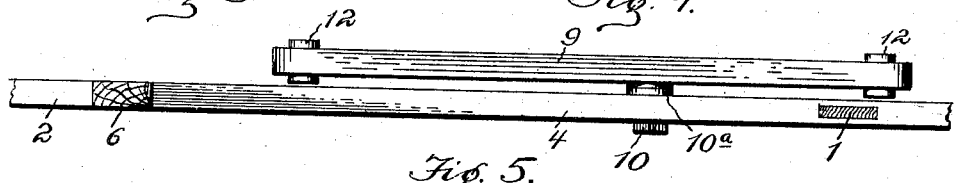

Figure 1 is a top plan view of the shafts and equalizer. Fig. 2 is a transverse sectional view on the line 2 2 of Fig. 1. Fig. 3 is a side elevation of one of the connecting-straps 13; and Fig. 4 is a detail view of the joint formed between the evener-bar and one of the connecting-straps, and Fig. 5 is a sectional view on the line 5 5 of Fig. 1.

In the drawings, 1 denotes the shafts of a vehicle connected together at their inner ends by a cross-bar 2. One of the shafts is extended to the rear, as indicated at 3, and is fastened eccentrically to a second cross-bar 4. Connecting the right-hand shaft and the cross-bar 4 is a brace-rod 8. Secured to the outer ends of the cross-bar 4 are thill-pieces 5 and 6, one of them, 6, being longer than the other and having its forward end extended and rigidly connected to the main cross-bar 2. These thill-pieces are provided at their inner ends with suitable thill-couplings 7, by which they are secured, equidistant between the wheels, to the front axle of a vehicle. A rub-iron $3^a$ is fastened to the upper side of the shafts at the junction of the thill-piece 6 and the cross-bar 2. It is evident that by having the shafts so constructed and positioned they will set considerably to one side of the center line of the vehicle. I prefer to have the shafts set to the left of the center line; but I may build them to the right if I so desire.

To the cross-bar 4 I pivot an evener-bar 9 by means of a bolt 10 passing through the cross-bar 4, which bolt or pivot stands a little to the left of the center line of the vehicle, which center line passes just inside one of the shafts. Plates $10^a$, through which the bolt 10 passes, are provided to raise the evener 9 from the cross-bar 4. Straps 13, having forked ends 12, are pivoted to the ends of the evener-bar by pivot-bolts $12^a$, which pass through the forked ends 12 of the straps, and holes provided in the evener-bar near its ends. The straps 13 are formed with outer forked ends 14, which receive the singletree and pivotally secure it therein by bolts 15.

The singletree is composed of two levers 16 and 17, joined together and pivoted to the cross-bar 2 by a bolt 18, placed coincident with the center line of the vehicle. The lever 16 is preferably made of wood and is considerably longer than the lever 17 and is connected at the center to the forked end 14 of the strap by one of the pivot-bolts 15. An ear 19 is secured to the inner end of the lever 16 by any suitable means—as, for instance, by a screw-threaded shank $19^a$. This ear 19 fits in the forked end 20 of the lever 17 and is held pivotally therein by the bolt 18, which passes through the cross-bar 2 and pivots the singletree thereto. A plate 18ª is provided on the bolt 18 to raise the singletree from the cross-bar. The lever 17 is made of iron or any suitable material and is pivoted in the forked end 14 of the strap 13 at a point on the lever 17 about one-third its length from its inner end. It will be observed that a portion of the lever 17 projects outside the shaft, and the trace when attached to the outer end of the lever will cross the shaft at the holdback.

From the foregoing it will be clearly seen that the draft is from the center of the vehicle, although the shafts are placed to one side thereof, and that all side draft is obviated, as the "pull" is equally divided and distributed by the equalizer. It will also be noticed that my evener being connected directly to the shafts and not having any direct connection with the axle of the vehicle, the draft will be transmitted to a point on the shafts directly coincident with the center line of the vehicle, thereby causing the draft to become central or even before it reaches the vehicle. Consequently it will be readily understood that what would otherwise result in a side draft is converted or equalized into a central draft.

The dimensions of my shafts and equalizer may be varied according to the ideas of the builder; but I find that an equalizer and shafts built on the scale herein given are very satisfactory and produce the result desired. The shafts are eight feet long over all and six feet from the cross-bar 2 to their tips, where they are twenty-four inches across, inside measurement. At the cross-bar 2 they measure thirty-five inches wide inside and between the thill-couplings forty-four inches. The thill-piece 6 measures twenty-four inches and the thill-piece 5 eighteen inches, and the cross-bar 4 forty-four inches, being placed eight inches back of the cross-bar 2. As to the equalizer, I make the lever 16 thirty-two inches long and the lever 17 nine inches long and the joint formed by the ear 19 and the forked end of the lever 17 one and one-eight inches in diameter. The evener-bar 9 I make nineteen inches between its joints and the holes for the pivot-bolts 12ª one and one-half inches from its ends. The straps 13 are eight inches long by three-fourths of an inch wide and have a slant of two inches, and one straddles the lever 16 at its center, while the other straddles the lever 17 at a point three inches from the pivot-bolt 18. When the equalizer is placed on the shafts, the bolt 18 is passed through the cross-bar 2 at a point therein coincident with the center line of the vehicle. The lever 17 will project outside the right-hand shaft about four inches, while the end of the lever 16 will come close to the left thill. On the cross-bar 4 and two inches to the left of the line of central draft I pivot the evener-bar 9 by the bolt 10, which passes through the evener-bar seven inches from its right-hand end and twelve inches from its left-hand end. By making the several parts as above given a strong and symmetrical as well as a practical construction is obtained.

I have illustrated and described with particularity the preferred details of construction and arrangement of parts, yet it is to be understood that changes can be made therein and essential features of my invention still be retained.

Having described my invention and set forth its merits, what I claim is—

1. In an equalizer, the combination of the shafts, thill-pieces set to one side of the shafts and connected together, an evener-bar supported between the thill-pieces, a singletree supported between the shafts, and strap connections between the singletree and evener-bar, substantially as described.

2. In an equalizer, the combination of the shafts, thill-pieces set to one side of the shafts, a cross-bar connecting the thill-pieces, an evener-bar pivoted on the cross-bar, a singletree supported between the shafts, and strap connections between the singletree and evener-bar, substantially as described.

3. In an equalizer, the combination of the shafts, thill-pieces set to one side of the shafts, a cross-bar connecting the thill-pieces, an evener-bar pivoted on the cross-bar, a second cross-bar connecting the shafts, a singletree pivoted on the second cross-bar, and strap connections between the singletree and evener-bar, substantially as described.

4. In an equalizer, the combination of the shafts, thill-pieces set to one side of the shafts, a cross-bar connecting the thill-pieces, an evener-bar pivoted eccentrically on the cross-bar, a second cross-bar connecting the shafts, a jointed singletree pivoted on the second cross-bar, and strap connections between the singletree and the evener-bar, substantially as described.

5. In an equalizer, the combination of the shafts, thill-pieces set to one side of the shafts, a cross-bar connecting the thill-pieces, an evener-bar pivoted eccentrically on the cross-bar, a second cross-bar connecting the shafts, a singletree comprising two levers joined together and pivoted on the second cross-bar, and straps connecting the evener-bar with the levers of the singletree, substantially as described.

6. In an equalizer, the combination of the shafts, thill-pieces set to one side of the shafts and connected to the front axle of the vehicle, a cross-bar connecting the thill-pieces, an evener-bar pivoted on the cross-bar to one side of the central line of the vehicle, a second cross-bar connecting the shafts, a jointed singletree pivoted on the second cross-bar coincident with the central line of the vehicle, and straps connecting the evener-bar and the singletree, substantially as described.

7. The combination with the shafts of a vehicle, thill-pieces set to one side of the shafts, a cross-bar connecting the thill-pieces and fastened to one of the shafts, and a second cross-bar connecting the shafts and fastened to one of the thill-pieces, the end of one cross-bar projecting beyond the end of the other cross-bar, substantially as described.

In testimony whereof I affix my signature in presence of two witnesses.

ANDREW ANDERSON.

Witnesses:
A. A. BUCK,
CHAS. JENSEN.